(12) United States Patent
Lasak et al.

(10) Patent No.: US 12,539,799 B2
(45) Date of Patent: Feb. 3, 2026

(54) METHOD FOR ACTUATING AT LEAST ONE FLUID ACTUATOR IN A MOTOR VEHICLE SEAT SYSTEM

(71) Applicant: Faurecia Autositze GmbH, Hannover (DE)

(72) Inventors: Jacek Lasak, Jaroszów (PL); Michal Szott, Grojec (PL); Damian Wojtyna, Walbrzych (PL)

(73) Assignee: Faurecia Autositze GmbH, Hannover (DE)

( * ) Notice: Subject to any disclaimer, the term of this patent is extended or adjusted under 35 U.S.C. 154(b) by 371 days.

(21) Appl. No.: 18/315,707

(22) Filed: May 11, 2023

(65) Prior Publication Data

US 2023/0382284 A1 Nov. 30, 2023

(30) Foreign Application Priority Data

May 24, 2022 (DE) .......................... 102022113031.2

(51) Int. Cl.
*B60N 2/90* (2018.01)
(52) U.S. Cl.
CPC .................... *B60N 2/914* (2018.02)
(58) Field of Classification Search
CPC ............ B25J 9/142; F15B 9/09; F15B 15/103
USPC ................................................... 318/811, 599
See application file for complete search history.

(56) References Cited

FOREIGN PATENT DOCUMENTS

JP 2017226354 A * 12/2017 ............. B60N 2/665

* cited by examiner

*Primary Examiner* — Nathaniel E Wiehe
*Assistant Examiner* — Daniel S Collins
(74) *Attorney, Agent, or Firm* — Laurence P. Colton; Smith Tempel Blaha LLC

(57) ABSTRACT

A method for actuating a fluid actuator in a motor vehicle seat system having a motor vehicle seat and a pneumatic system for actuating a seat function. The pneumatic system has a pump and the fluid actuator housed in the motor vehicle seat. The pump motor is an electric motor controlled by a PWM signal and is set up to fill the fluid actuator with fluid within a filling phase. The pneumatic system is set up to withdraw fluid from a fluid actuator filled with fluid, in an emptying phase. The fluid actuator runs through a plurality of filling phases and emptying phases in succession. The duty cycle of the PWM signal is set to a working level during a filling phase and is lowered to a lower level between filling phases. The lower level is dimensioned such that the rotor of the pump motor can still rotate.

10 Claims, 2 Drawing Sheets

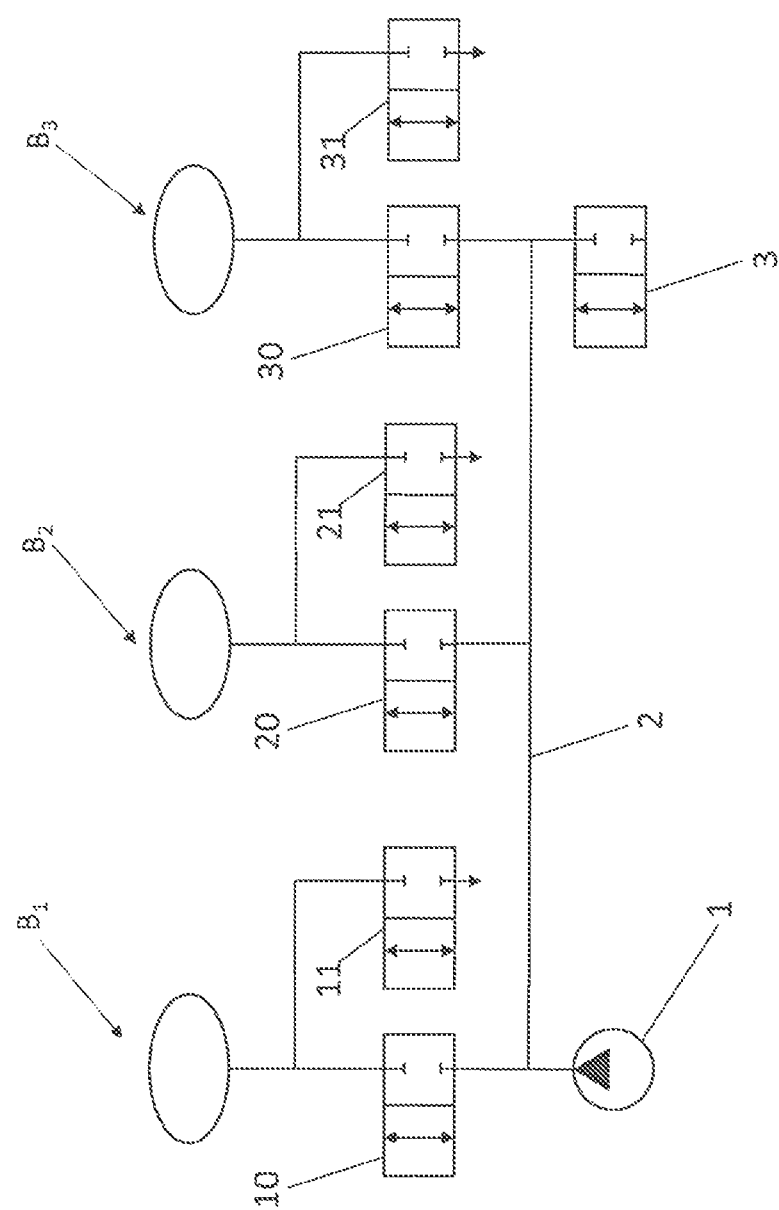

METHOD FOR ACTUATING AT LEAST ONE FLUID ACTUATOR IN A MOTOR VEHICLE SEAT SYSTEM

CROSS REFERENCE TO RELATED APPLICATIONS

This patent application claims priority on and the benefit of German Patent Application No. 10 2022 113 031.2 having a filing date of 24 May 2022.

BACKGROUND OF THE INVENTION

Technical Field

The invention relates to a method for actuating at least one fluid actuator in a motor vehicle seat system.

Prior Art

In a motor vehicle seat system, fluid actuators, which are usually realized by means of fluid-fillable bladders, are typically used for comfort adjustment or for realizing a massage function. Especially for massage functions, a pneumatic system is used which periodically fills the fluid actuators with fluid, usually air, and also at least partially empties the fluid actuator again. Usually, a plurality of such fluid actuators is supplied with fluid via a common line system. For this purpose, a pump is generally used, which is operated via an electric motor. Often, such electric motors are controlled via PWM signals (pulse width modulation signals) in order to specify a specific motor rotational speed.

A typical time curve of the filling pressure p in the fluid actuator is shown as an example in FIG. 1. In the upper diagram, for three fluid actuators $B_1$ to $B_3$ filled one after the other, the pressure profile within the respective fluid actuator is plotted as a function of time t (solid line) and the current consumption I of the electric motor of the pump used is plotted as a function of time t (dashed line). It can be seen that the pressure p in each of the bladders $B_1$ to $B_3$ initially increases (corresponds to the filling phase) and then decreases again (corresponds to an emptying phase). It can also be seen that the pump current I reaches a current peak $I_{Ein}$ when the pump is switched on and drops back to 0 when the pump is switched off. In the lower diagram in FIG. 1, the PWM duty cycle is plotted as a function of time t. In the present case, the voltage applied to the pump is varied accordingly, and during the switch-on phase is held at a working level $V_A$. During this time, the electric motor of the pump is supplied with power. The above-named current peak is reached each time the pump is switched on (again). This switch-on current $I_A$ is clearly above the required operating current of the electric motor and results in the service life of the pump being impaired in the case of many switch-on cycles (three of these are shown as examples in FIG. 1).

BRIEF SUMMARY OF THE INVENTION

It is therefore an object of the present invention to provide a method for actuating at least one fluid actuator in a motor vehicle seat system, with which method the service life of the pump used can be extended.

This object is achieved by a method for actuating at least one fluid actuator in a motor vehicle seat system which has a motor vehicle seat and a pneumatic system for actuating a seat function, namely a seat massage function or seat adjustment functions, wherein the pneumatic system comprises a pump and the at least one fluid actuator housed in the motor vehicle seat, wherein the motor of the pump is an electric motor controlled by a PWM signal and the pump is set up to fill the at least one fluid actuator to fill with fluid within a filling phase, wherein the pneumatic system is further set up to withdraw fluid from a fluid actuator filled with fluid in an emptying phase, wherein the at least one fluid actuator or a plurality of fluid actuators runs/run through a plurality of filling phases and emptying phases in temporal succession, wherein the duty cycle of the PWM signal applied to the electric motor of the pump is set to a working level during a filling phase and is lowered to a level lower than the working level between the filling phases, the lower level being dimensioned such that the rotor of the electric motor of the pump can still rotate. Advantageous embodiments can be found in the subclaims.

According to the invention, a method for actuating at least one fluid actuator in a motor vehicle seat system is proposed, wherein the motor vehicle seat system comprises a motor vehicle seat and a pneumatic system for actuating a seat function, namely a seat massage function or seat adjustment functions. The pneumatic system here comprises a pump and the at least one fluid actuator housed in the motor vehicle seat. The motor of the pump is an electric motor controlled by a PWM signal. The pump is set up to fill the at least one fluid actuator with fluid within a filling phase. Further, the pneumatic system is set up to withdraw fluid from a fluid actuator filled with fluid in an emptying phase. The at least one fluid actuator or a plurality of fluid actuators runs/run through a plurality of filling phases and emptying phases in temporal succession.

In the method according to the invention, the duty cycle of the PWM signal applied to the electric motor of the pump is set to a working level during a filling phase. Between the filling phases, this duty cycle is lowered to a level lower than the working level. This lower level is dimensioned such that the rotor of the electric motor of the pump can still rotate.

When the method according to the invention is carried out, the pump therefore does not switch off, but is further operated with a minimum duty cycle. Due to the fact that the pump is not switched off, the high switch-on currents are omitted in further filling phases, i.e., when increasing the duty cycle and thus the current consumption, so that the pump is protected by this operating mode. Instead of the high switch-on currents, the current level is only raised to a working current which is below the switch-on current and is sufficient to be able to carry out the filling process. The pump thus remains permanently switched on during the duration of a massage program, for example.

The at least one fluid actuator is preferably a fluid-fillable, flexible bladder. Air is advantageously used as the fluid. A voltage signal is preferably used as the PWM signal. By varying the voltage, the current consumption at the electric motor of the pump is changed.

It is advantageously provided that the pump is connected in terms of flow via a line to the at least one fluid actuator or a plurality of fluid actuators. A vent valve is also connected to the line. Since the pump remains switched on during the entire operating process, the pressure in the system can be reduced via this vent valve, so that the pneumatic system does not operate with overpressure even with a lower duty cycle of the pump. For example, the vent valve can be opened when the PWM signal is lowered to the low level.

The duty cycle of the PWM signal can in principle be set as desired at its working level. Ultimately, the level of the duty cycle at the working level is a function of the desired time duration of the filling process. According to a preferred embodiment, the duty cycle at the working level is 90%-100%, preferably 100%.

How the duty cycle of the PWM signal is to be set at the lower level is also a function of the specific circumstances. It is preferred here that the duty cycle at the lower level is 30%-40%, preferably 40%.

It has proven advantageous to set the duty cycle such that the maximum current consumption or the maximum operating current of the electric motor does not exceed certain values. It is advantageously provided in the method according to the invention that the maximum working current of the electric motor of the pump is 0.9 A or less, preferably 0.8 A or less. Of course, this value must be greater than 0.

BRIEF DESCRIPTION OF THE DRAWINGS

The invention is explained in more detail below with reference to an exemplary embodiment, with the aid of FIGS. 2 and 3.

FIG. 2 shows an exemplary block diagram of a pneumatic system as part of a motor vehicle seat system which can be operated with the method according to the invention.

DETAILED DESCRIPTION OF PREFERRED EMBODIMENTS

The pneumatic system shown in FIG. 2 is part of a motor vehicle seat system. By way of example, three fluid actuators $B_1$ to $B_3$ are shown; of course, it is understood that such a pneumatic system according to the present invention can also have more or fewer such fluid actuators. A pump 1 which is operated with a PWM-controlled electric motor can also be seen. The pump 1 is fluidically connected to the fluid actuators $B_1$ to $B_3$ via a common line 2. At the end of the common line 2 there is a vent valve 3, which can be switched, for example, when the common line 2 is at an overpressure level when the pump 1 is running but the filling valves 10, 20, 30 of the fluid actuators are closed, as shown in the example of FIG. 2. The valves 11, 21, 31 are vent valves with which the respective fluid actuators $B_1$ to $B_3$ can be emptied individually.

Figure 3:
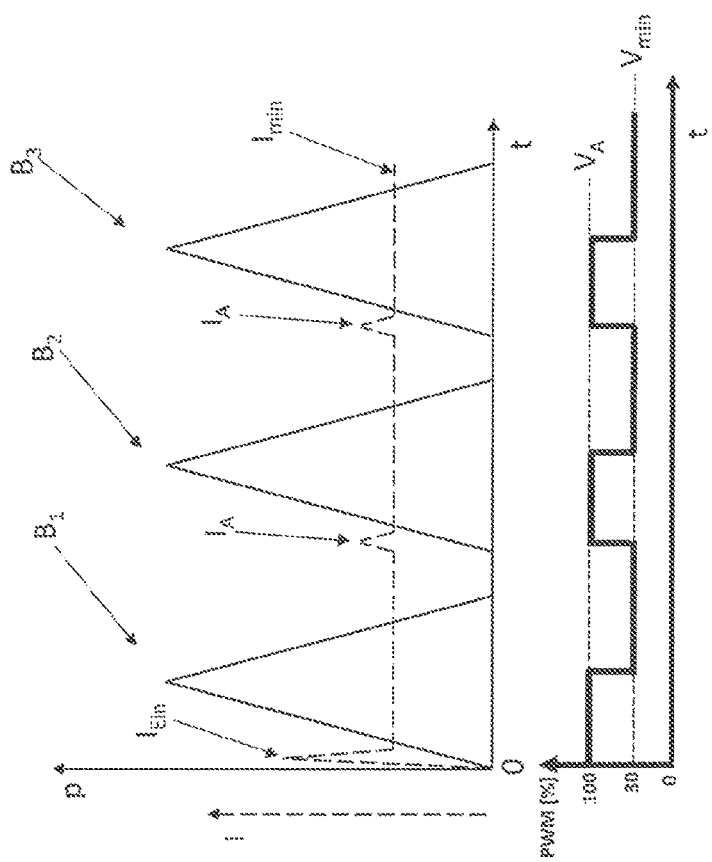
FIG. 3 shows a typical pressure and current curve over time in the case of a system according to the invention with the components from FIG. 2.
Figure 1:
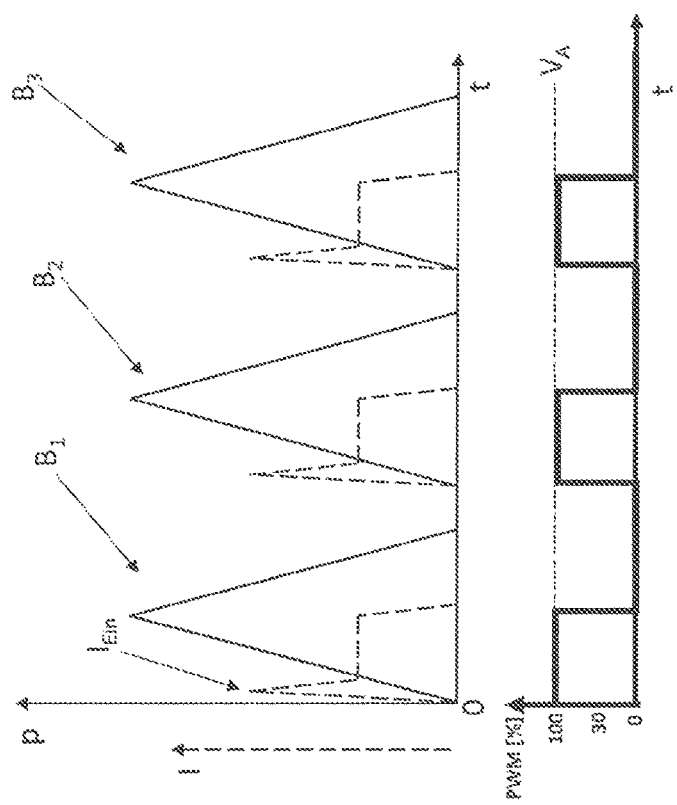
FIG. 1 shows a typical pressure and current curve over time in pneumatic systems according to the prior art.

With reference to FIG. 3, the method according to the invention is briefly explained below. The image is kept similar to the illustration for the method according to the prior art. In this respect, reference is additionally made to the description of FIG. 1. Here as well, the exemplary three fluid actuators $B_1$ to $B_3$ are filled and emptied one after the other.

In contrast to the prior art, the duty cycle of the PWM signal in the emptying phase is not lowered to zero, but rather is held at a level $V_{min}$ that is reduced or lower in contrast to the working level $V_A$. Looking at the current curve, the switch-on current $I_{Ein}$ is thus also reached in the first filling phase of the first fluid actuator $B_1$, but only once, namely at the beginning of the adjustment or massage cycle. After each filling process, the duty cycle is reduced from 100% ($V_A$) to 30% ($V_{min}$) here as an example. Other duty cycles than those shown here can also be used. By lowering the duty cycle to the lower level $V_{min}$, a current $I_{min}$ continues to flow through the electric motor of the pump. In the next filling phase, the duty cycle is raised from the lower level $V_{min}$ back to the working level $V_A$, while the current consumption I is also temporarily increased only to a maximum operating current $I_A < I_{Ein}$ and then decreases again, preferably still during the filling phase, to $I_{min}$. In this way, the pump always remains switched on and the rotor of the pump motor can still rotate.

However, since unlike in the prior art (see FIG. 1) the operating current of the pump also reaches the level of the switch-on current $I_A$, the pump motor is protected and its service life improved.

A further advantage of the invention is that no new components have to be installed; rather, existing pumps are simply given a longer service life through modified operation. In addition, when designing new systems, it is possible to meet requirements for a desired service life even with more cost-effective pumps.

What is claimed is:

1. A method for actuating at least one fluid actuator ($B_1$-$B_3$) in a motor vehicle seat system which has a motor vehicle seat and a pneumatic system for actuating a seat function, namely a seat massage function or seat adjustment functions,
   wherein the pneumatic system comprises a pump (1) and the at least one fluid actuator ($B_1$-$B_3$) housed in the motor vehicle seat,
   wherein the motor of the pump (1) is an electric motor controlled by a PWM signal and the pump (1) is set up to fill the at least one fluid actuator ($B_1$-$B_3$) to fill with fluid within a filling phase,
   wherein the pneumatic system is further set up to withdraw fluid from a fluid actuator ($B_1$-$B_3$) filled with fluid in an emptying phase,
   wherein the at least one fluid actuator ($B_1$-$B_3$) or a plurality of fluid actuators ($B_1$-$B_3$) runs/run through a plurality of filling phases and emptying phases in temporal succession,
   wherein the duty cycle of the PWM signal applied to the electric motor of the pump (1) is set to a working level ($V_A$) during a filling phase and is lowered to a level ($V_{min}$) lower than the working level ($V_A$) between the filling phases, the lower level ($V_{min}$) being dimensioned such that the rotor of the electric motor of the pump (1) can still rotate,
   wherein the pump (1) is fluidically connected via a line (2) to the at least one fluid actuator ($B_1$-$B_3$) or to a plurality of fluid actuators ($B_1$-$B_3$), wherein a vent valve (3) is also connected to the line (2),
   wherein the vent valve (3) is opened when the PWM signal is lowered to the low level ($V_{min}$).

2. The method according to claim 1, wherein the at least one fluid actuator ($B_1$-$B_3$) is a fluid-fillable, flexible bladder.

3. The method according to claim 1, wherein air is used as the fluid.

4. The method according to claim 1, wherein a voltage signal is used as PWM signal.

5. The method according to claim 1, wherein the duty cycle of the PWM signal at the working level ($V_A$) is 90%-100%.

6. The method according to claim 1, wherein the duty cycle of the PWM signal at the lower level ($V_{min}$) is 30%-40%.

7. The method according to claim 1, wherein the maximum operating current ($I_A$) of the electric motor of the pump (1) is 0.9 A or less.

8. The method according to claim 1, wherein the duty cycle of the PWM signal at the working level ($V_A$) is 100%.

9. The method according to claim 1, wherein the duty cycle of the PWM signal at the lower level ($V_{min}$) is 40%.

10. The method according to claim 1, wherein the maximum operating current ($I_A$) of the electric motor of the pump (1) is 0.8 A or less.

\* \* \* \* \*